United States Patent [19]
Mikite et al.

[11] 3,806,601
[45] Apr. 23, 1974

[54] CHOLESTEROL- AND LIPOID-LOWERING THERAPEUTICAL AGENT

[75] Inventors: Gyula Mikite; Janos Fischer; Jozsef Rakoczi; Jozsef Borsi; Sandor Elek; Istvan Polgari; Istvan Elekes; Andrea Maderspach, all of Budapest, Hungary

[73] Assignee: EGYT Gyogyszervegyeszeti Gyar, Budapest, Hungary

[22] Filed: Nov. 15, 1971

[21] Appl. No.: 198,976

[30] Foreign Application Priority Data
Nov. 18, 1970   Hungary............................. EE 1864

[52] U.S. Cl. .............................................. 424/322
[51] Int. Cl............................................... A61k 27/00
[58] Field of Search.................................. 424/322

[56] References Cited
UNITED STATES PATENTS
3,245,878   4/1966   Berger et al. ....................... 424/322

OTHER PUBLICATIONS
Bull. Soc. Chim. France (1964), 383–387.

*Primary Examiner*—Albert T. Meyers
*Assistant Examiner*—Frederick E. Waddell
*Attorney, Agent, or Firm*—Young & Thompson

[57] ABSTRACT

Bis-[p-chlorophenoxy]-acetyl-urea, a compound prepared by reacting sodium salt of urea with a $C_{1-4}$ alkyl bis-[p-chlorophenoxy]-acetate, has excellent therapeutical activities and can be used first of all as cholesterol- and lipoid-lowering agent. This compound may be administered in a daily dose of 25 to 250 mg. for adults.

1 Claim, No Drawings

CHOLESTEROL- AND LIPOID-LOWERING THERAPEUTICAL AGENT

This invention relates to a process for the preparation of bis-/p-chlorophenoxy/-acetyl-urea.

Up to now, this compound has been synthetized by a two-step process starting from bis-/p-chlorophenoxy/-acetic acid. According to this process, in the first step the acid is converted to bis-/p-chlorophenoxy/-acetyl-chloride in the presence of excessive amount of thionyl chloride. The excess of thionyl chloride is evaporated and the obtained acid chloride is reacted with urea in chloroform to give bis-/p-chlorophenoxy/-acetyl-urea in a yield of 50 % /Bull. soc. chim. France 1964, 383/. This compound has been referred to as a pesticide agent. The above mentioned process has, however, several disadvantages. Namely, preparation of the acid chloride is difficult /the excess of thionyl chloride can only be removed by repeated distillations, during which a part of the acid chloride decomposes/, and the second step of the process can only be carried out with a low yield.

Now we have found that the above compound can be prepared far more favourably by reacting $C_{1-4}$ alkyl-bis-/p-chlorophenoxy/-acetates with the sodium salt of urea. The sodium salt of urea can be prepared by dissolving dry urea in an inert solvent and adding equimolar amount of sodium hydride to the solution at a temperature below 0°C. Sodium hydride may be used in pure state or in the form of its dispersion; satisfactory results can be achieved e.g. by using a 50 percent mineral oil dispersion of sodium hydride.

Thereafter the thus-obtained sodium salt of urea is reacted with an alkyl bis-/p-chlorophenoxy/-acetate at −10°C. The corresponding urea-derivative can be isolated from the reaction mixture with a yield of 85 to 90 % /calculated on the ester-derivative/. The use of the ester-derivative for the preparation of bis-/p-chlorophenoxy/-acetyl-urea results in several advantages, namely a. the starting compounds can easily be prepared with high yields.

b. the preparation of acid chloride may be omitted, c. the end-product can be prepared in higher yields.

Alkyl-bis-/p-chlorophenoxy/-acetates, used as starting substance, may be prepared according to known methods /e.g. Berichte 27, 1894 p. 2795; Hungarian Patent Specification No. 156,082/. It is to be mentioned that the reaction of alkyl-bis-/p-chlorophenoxy/-acetates with sodium salt of urea has never been described in the literature.

According to our examinations, bis-/p-chlorophenoxy-acetyl-urea has valuable pharmacological properties; especially the action exerted on the lipid metabolism and on the liver is of importance.

Among the effects exerted on lipid metabolism, the hypolypaemic effect is the most important one. According to our investigations, after adiministering bis-/p-chlorophenoxy/-acetyl-urea to normolipaemic rats for a few days, a significant decrease of the serum cholesterol and triglyceride level can be observed. In this respect, the compound prepared according to the invention is far more active than Clofibrate [2-/4-chlorophenoxy/-isobutyric acid ethyl ester].

In order to compare the cholesterol- and triglyceride-lowering effect of bis-/p-chlorophenoxy/acetyl-urea and of Clofibrate, tests were carried out on male rats. The compounds to be tested were administered orally to a group of animals during 10 days, and the serum cholesterol and serum triglyceride level was determined. The results are summarized in Table 1. The experiments were carried out on groups consisting of 10 animals.

Table 1.

| Compound | Dosis mg/kg | Serum-cholesterol mg% ± s.e. | Serum-triglyceride mg% ± s.e. | Alteration % cholesterol | Alteration % triglyceride |
|---|---|---|---|---|---|
| Control | | 177.2±6.9 | 98.0±13.2 | — | — |
| CAU | 3.0 | 178.6±8.6 | 48.2± 7.72 | +0.8 | −50.8* |
| do. | 10.0 | 135.3±4.83 | 38.2± 4.59 | −23.6* | −61.0* |
| do. | 30.0 | 109.5±3.90 | 27.6± 3.16 | −38.2* | −71.8* |
| do. | 100.0 | 93.5±4.28 | 27.9± 2.32 | −47.2* | −71.5* |
| Control | | 157.5±4.2 | 67.3± 4.47 | — | — |
| Clofibrate | 30.0 | 145.0±2.25 | 63.9±−3.91 | −7.9* | −5.0 |
| do. | 100.0 | 142.2±3.16 | 42.1± 2.39 | −9.7* | −37.4* |
| do. | 300.0 | 130.0±5.47 | 42.2± 4.83 | −17.4* | −37.4* |

*Statistically significant changes /p < 0.05/.

Remark: The determination of cholesterol was carried out by the method of Zlatkis et al. /J.Lab.Clin. Med. 41, 486, 1953/. and that of the triglycerides by the method of E. Van Handel and D. B. Zilversmit /J.Lab.Clin.Med. 50, 152, 1957/.

CAU = b-/p-chlorophenoxy/-acetyl-urea

The cholesterol and trigylceride lowering effect of the compound manifests in experimental hyperlipaemia also in small doses. The effect of the compound on the hyperlipidaemia provoked by Triton WR-1339 /200 mg/kg i.p./ is better than the effect of Clofibrate, as illustrated in Table 2. These comparative tests were carried out on male rats.

Table 2.

| Compound | Dosis mg/kg | Serum-cholesterol mg% ± s.e. | Serum-triglycerides mg% ± s.e. | Percent change cholesterol | Percent change triglycerides |
| --- | --- | --- | --- | --- | --- |
| Control |  | 320.5±14.4 | 1403.3±98.7 | — | — |
| CAU | 10.0 | 298.8±12.1 | 882.1±63.2 | −6.7 | −37.1* |
|  | 30.0 | 264.6±11.7 | 647.5±44.7 | −17.4* | −53.8* |
| Control |  | 364.0±15.2 | 1842.0±133.4 | — | — |
| Clofibrate | 100.0 | 378.3±17.7 | 2051.0±143.5 | +m3.9 | +11.3 |
|  | 300.0 | 351.3±13.9 | 1781.0±129.6 | −3.5 | −3.3 |

*Statistically significant changes /p<0.05/.

Remark: After 10 days of oral pre-treatment with the compound to be tested, standard doses [200 mg/kg i.v.] of Triton WR-1339 were administered into each of the rats. Determinations were performed 6 hours after administration of Triton. Methods of the determinations: see Table 1. The tests were carried out on groups consisting of 10 animals.

The inhibition of the biosynthesis of cholesterol plays an important role in the lipid-lowering effect of bis-/p-chlorophenoxy/-acetyl-rea. This compound inhibits the incorporation of $C^{14}$-acetate into the free cholesterol fraction both in the liver and in the serum. As it turns out from the data on Table 3, bis-/p-chlorophenoxy/-acetate-urea is more active than Clofibrate also in this respect.

Table 3.

| Compound | Dosis | Serum specific activity DPM/mg cholesterol±s.e. Serum | Serum specific activity DPM/mg cholesterol±s.e. Liver | Percent change Serum | Percent change Liver |
| --- | --- | --- | --- | --- | --- |
| Control |  | 3809−608 | 3834±543.9 |  |  |
| CAU | 30.0 | 1902±265 | 1368±128.0 | −50.1* | −74.30* |
| Clofibrate | 300.0 | 3049±356 | 2471±356.0 | −20.0* | −35.60* |

*Statistically significant changes /p<0.05/.

Remark: Investigations were carried out on male rats orally pre-treated with the compound to be tested. The compound was administered for ten days, thereafter a 50 μ Ci dose of $C^{14}$-acetate was injected i.p. The determinations were performed 2 hours after injection. The purification of cholesterol was carried out according to Folch et al. /J.Biol.Chem. 266, 947, 1957/. Tests were carried out on groups consisting of 5 rats.

An additional valuable property of bis-/p-chlorophenoxy/-acetyl-urea is that it increases the mass of liver parenchyma. Due to this effect, both the number and the volume of liver cells increase.

This effect of bis-/p-chlorophenoxy/-acetyl-urea appears in much smaller doses than in case of Clofibrate treatment. The data referring to the hepatomegalic effect of bis-/p-chlorophenoxy/-acetyl-urea and of Clofibrate are listed in Table 4.

Table 4.

| Compound | Dosis mg/kg | Liver weight g/100 g of body weight ±s.e. | Liver weight % change |
| --- | --- | --- | --- |
| Control |  | 3.94±0.097 | — |
| CAU | 3.0 | 4.08±0.065 | + 3.55 |
|  | 10.0 | 4.85±0.120 | + 18.80* |
|  | 30.0 | 5.39±0.110 | + 36.80* |
|  | 100.0 | 6.02±0.220 | + 52.80* |
| Control |  | 4.15±0.10 | — |
| Clofibrate | 10.0 | 4.07±0.10 | − 1.9 |
|  | 30.0 | 4.28±0.076 | + 3.13 |
|  | 100.0 | 5.05±0.14 | +21.60* |
|  | 300.0 | 6.21±0.16 | +49.60* |

*Statistically significant changes /p < 0.05/.

Remark: These results are obtained by p.o. treatment of male rats for ten days.

The hepatomegalic effect of the compound is accompanied neither by pathological changes of liver function /BSP, SGOT, and SGPT/, nor by histopathological changes referring to damage of liver. The liver-protecting effect of the compound is proved by the observation that the narcotic effect of hexobarbital in rats is decreased, the elimination of BSP from the blood is increased, and the hepatotoxic effect of tetrachloromethane is inhibited by the use of bis-/p-chlorophenoxy/-acetyl-urea. The favourable lipid-lowering and liver-protecting effects of bis-/p-chlorophenoxy/-acetyl-urea appear also when the compound is added orally in small doses. This fact proves the good absorption of the compound from the gastro-intestinal tract. A further advantage is that the toxicity of the compound on mice and rats is very low; $LD_{50}$ values are more favourable in both species of animals than those obtained in the case of Clofibrate.

Table 5.

| Species | Compound | $LD_{50}$ mg/kg per os | [19/20 confidence limit] |
|---------|----------|------------------------|--------------------------|
| Mouse | CAU | 3500 | /2215–5530/ |
| | Clofibrate | 2290 | /2008–2610/ |
| Rat | CAU | 3100 | /2695–3565/ |
| | Clofibrate | 1800 | /1500–2160/ |

Remark: The $LD_{50}$ values relate to the results obtained on the $7^{th}$ day of treatment. Evaluation has been carried out using the probitanalysis according to Litchfield-Wilcoxon.

Bis-/p-chlorophenoxy/-acetyl-urea can be administered orally in the form of tablets, powders, capsules, syrups, granulates and solutions. The compositions may contain pharmaceutically acceptable organic and inorganic auxiliary substances, such as granulating additives, excipients, lubricants, wetting agents and antioxidants, further colouring, flavouring and sweetening agents, etc. In the tabletting process, granulating additives, such as calcium carbonate, lactose and talc, disintegrating agents, such as starch, binding materials, such as gelatine and tragacanth and lubricants, such as magnesium stearate and stearic acid may be used. In the preparation of suspensions, insert suspending agents, such as methylcellulose and tragacanth, and wetting agents, such as lecithin may generally be used. The capsules may contain the active ingredient as such, or in admixture with an inert solid vehicle, such as calcium carbonate.

The daily dose of bis-/p-chlorophenoxy/-acetyl urea varies between 25 and 250 mg., it is advisable, however, to add the active agent in smaller doses /e.g. in a dose of 50 to 100 mg./ 2 to 4 times a day. The active agent may also be administered in the form of a sustained-release composition.

The granulates, tablets, coated tablets can be prepared and used in the form of sustained-release compositions. Using such compositions it can be ensured that the disintegration of the composition and the absorption of the active agent takes place in the most preferred part of the organism —i.e. in the gastrointestinal tract -, and/or that the absorption of the active agent takes in gradually.

Capsules may contain the active ingredient as such or in admixture with an inert, solid vehicle. Th active ingredient may be present in the capsules in granulated form, as well.

The process according to the invention is further elucidated by the aid of the following non-limiting Examples.

EXAMPLE 1

A solution of 6.0 /0.1 mole/ of dry urea in 100 ml. of abs. dimethyl formamide is cooled to −10°C and 4.8 g. /0.1 mole/ of sodium hydride is added in the form of a 50 percent oily suspension to the solution. The mixture is stirred for 1 hour then it is reacted with 13.08 g. /0.04 moles/ of methyl- bis/p-chlorophenoxy/-acetate at −10°C for 3 hours. Thereafter the mixture is poured onto 200 g. of granulated ice, extracted three times with 25 ml. portions of ethyl acetate. The extract is dried over magnesium sulfate and the solvent is evaporated in vacuo. The residue is recrystallised from ethanol. 12.70 g. /90 %/ of bis-/p-chlorophenoxy/-acetyl-urea are obtained, m.p. 131°–133°C.

| Analysis: | C | H | Cl | N |
|-----------|-------|------|-------|------|
| Calculated % | 50.78 | 3.40 | 19.96 | 7.90 |
| Found % | 50.95 | 3.69 | 19.76 | 7.78 |

EXAMPLE 2

The active ingredient, lactose and the two-thirds amount of potatoe starch are homogenized in a kneating machine. The mixture is blended with a 20 percent aqueous solution of gelatine to form a homogenous mass. This mass is granulated through an acid-proof sieve /mesh > 0.9 mm/. The granules are dried, and repeatedly granulated through a sieve of 0.9 mm gaps. The granulated mass is dried, homogenized, and mixed with magnesium stearate, talcum and one-third amount of the potatoe starch according to the given formulation. The mixture is pressed into tablets. Formulation:

| | 100 mg. | 50 mg. |
|---|---------|--------|
| Active ingredient | 0.1000 g. | 0.0500 g. |
| Lactose | 0.0600 g. | 0.0600 g. |
| Potatoe starch | 0.0280 g. | 0.0210 g. |
| Gelatine | 0.0040 g. | 0.0030 g. |
| Talc | 0.0060 g. | 0.0045 g. |
| Magnesium stearate | 0.0020 g. | 0.0015 g. |
| | 0.2000 g. | 0.1400 g. |

EXAMPLE 3

The prescribed amounts of the active ingredient and of lactose are mixed with a 15 percent alcoholic solution of polyvinylpyrrolidone as described in Example 2. The obtained mass is granulated through an acid-proof sieve of about 0.9 mm. mesh, the granules are dried and repeatedly granulated through a sieve of 0.9 mm. gaps. The obtained granules are filled in capsules. Formulation:

| | 100 mg. | 50 mg. |
|---|---------|--------|
| Active ingredient | 0.1000 g. | 0.0500 g. |
| Lactose | 0.0940 g. | 0.1440 g. |
| Polyvinylpyrrolidone | 0.0060 g. | 0.0060 g. |
| | 0.2000 g. | 0.2000 g. |

What we claim is:

1. A method of reducing serum cholesterol and serum lipoid levels in adult animals suffering from hyperlipemia, comprising administering orally to said animals 25 to 250 milligrams per day of bis-(p-chlorophenoxy)-acetyl-urea.

* * * * *